US011625554B2

(12) United States Patent
Qian et al.

(10) Patent No.: US 11,625,554 B2
(45) Date of Patent: Apr. 11, 2023

(54) L2-NONEXPANSIVE NEURAL NETWORKS

(71) Applicant: International Business Machines Corporation, Armonk, NY (US)

(72) Inventors: Haifeng Qian, Yorktown Heights, NY (US); Mark Wegman, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 987 days.

(21) Appl. No.: 16/266,755

(22) Filed: Feb. 4, 2019

(65) Prior Publication Data
US 2020/0250480 A1   Aug. 6, 2020

(51) Int. Cl.
*G06K 9/00* (2022.01)
*G06K 9/62* (2022.01)
*G06F 17/16* (2006.01)
*G06N 3/08* (2023.01)
*G06N 3/04* (2023.01)

(52) U.S. Cl.
CPC .......... *G06K 9/6257* (2013.01); *G06F 17/16* (2013.01); *G06N 3/0481* (2013.01); *G06N 3/08* (2013.01)

(58) Field of Classification Search
CPC ....... G06K 9/6257; G06F 17/16; G06F 17/11; G06N 3/0481; G06N 3/08; G06N 3/0445; G06N 3/0454; G06N 3/0472; G06N 3/082; G06N 3/088; G06V 10/82; G06V 30/18057; G06V 30/10
See application file for complete search history.

(56) References Cited

U.S. PATENT DOCUMENTS

| 6,473,746 | B1 |    | 10/2002 | Zakrzewski |           |
|-----------|----|----|---------|------------|-----------|
| 7,933,847 | B2 |    | 4/2011  | Andrew et al. |        |
| 9,640,186 | B2 |    | 5/2017  | Fousek et al. |        |
| 11,100,390| B2 |    | 8/2021  | McBride et al. |       |
| 11,182,677| B2 |    | 11/2021 | Rawal et al. |         |
| 2019/0228311 | A1 | | 7/2019 | Sarah et al. |         |
| 2019/0378037 | A1 | * | 12/2019 | Kale ......... | G06N 20/00 |
| 2020/0250480 | A1 | | 8/2020 | Qian et al. |          |
| 2021/0256304 | A1 | | 8/2021 | Hsiao |               |

FOREIGN PATENT DOCUMENTS

WO    WO-2020084683 A1 *  4/2020  ............. G06K 9/628

OTHER PUBLICATIONS

Cisse et al, Parseval Networks: Improving Robustness to Adversarial Examples, Proceedings of the 34th International Conference on Machine Learning, PMLR 70:854-863 (Year: 2017).*

Shang et al, Understanding and improving convolutional neural networks via concatenated rectified linear units, Proceedings of the 33rd International Conference on Machine Learning, New York, NY, USA (Year: 2016).*

(Continued)

*Primary Examiner* — Nancy Bitar
*Assistant Examiner* — Xiao Liu
(74) *Attorney, Agent, or Firm* — Peter Edwards, Esq.; McGinn I.P. Law Group, PLLC.

(57) ABSTRACT

A training method, system, and computer program product include training a neural network including using two-sided ReLU as a non-linear function or norm-pooling as a non-linear function and increasing a confidence gap.

20 Claims, 18 Drawing Sheets

100

TRAINING A NEURAL NETWORK INCLUDING USING TWO-SIDED RELU AS A NON-LINEAR FUNCTION OR NORM-POOLING AS A NON-LINEAR FUNCTION AND INCREASING A CONFIDENCE GAP.  ⎯ 101

(56) References Cited

OTHER PUBLICATIONS

Wan et al, CONFNET: Predict with Confidence, ICASSP, pp. 2921-2925 (Year: 2018).*
Gulcehre et al, Learned-norm pooling for deep feedforward and recurrent neural networks, ECML PKDD 2014, Part I, LNCS 8724, pp. 530-546 (Year: 2014).*
Ide et al, Improvement of learning for CNN with ReLU activation by sparse regularization, International Joint Conference on Neural Networks (IJCNN), pp. 2684-2691 (Year: 2017).*
United States Office Action dated May 13, 2022, in co-pending U.S. Appl. No. 16/266,761.
Kim et al. "Convolutional Neural Network Quantization using Generalized Gamma Distribution." http://arxiv.org/abs/1810.13329 2018. (Year: 2018).
Gulcehre et al. "Learned-norm pooling for deep neural networks." http://arxiv.org/abs/1311.1780 2013. (Year: 2013).
United States Notice of Allowance dated May 16, 2022, in co-pending U.S. Appl. No. 16/266,751.
Gouk, H. et al.; "Regularization of Neural Networks by Enforcing Lipschitz Continuity", 2018.
Mammel, H. et al.; "Gradient Descent Quantizes Relu Network Features", Mar. 22, 2018.
Qian, H. et al.; "L2-Non-Expansive Neural Networks", Jul. 3, 2018.
Zhang, X. et al.; "Learning One-Hidden-Layer Relu Networks via Gradient Descent", Jun. 20, 2018.
Mel, et al. "The NIST Definition of Cloud Computing". Recommendations of the National Institute of Standards and Technology. Nov. 16, 2015.

\* cited by examiner

TRAINING A NEURAL NETWORK INCLUDING USING TWO-SIDED RELU AS A NON-LINEAR FUNCTION OR NORM-POOLING AS A NON-LINEAR FUNCTION AND INCREASING A CONFIDENCE GAP. — 101

FIG. 3

| MaxIter | Model1 | Model2 | Model3 | Model4 |
|---|---|---|---|---|
| Natural | 99.1% | 98.5% | 98.7% | 98.2% |
| 100 | 70.2% | 91.7% | 77.6% | 75.6% |
| 1000 | 0.05% | 51.5% | 20.3% | 24.4% |
| 10K | 0% | 16.0% | 20.1% | 24.4% |
| 100K | 0% | 9.8% | 20.1% | 24.4% |
| 1M | 0% | 7.6% | 20.1% | 24.4% |

FIG. 4

| MaxIter | Model1 | Model2 | Model3 | Model4 |
|---|---|---|---|---|
| Natural | 95.0% | 87.1% | 79.2% | 77.2% |
| 100 | 0% | 13.9% | 10.2% | 20.8% |
| 1000 | 0% | 9.4% | 10.1% | 20.4% |
| 10K | 0% | 9.0% | 10.1% | 20.4% |
| 1000×10 | 0% | 8.7% | 10.1% | 20.4% |
| 100K | 0% | NA | 10.1% | 20.4% |

FIG. 5

| | Accu. | Gap | R-Accu. |
|---|---|---|---|
| no weight reg. | 99.4% | 68.3 | 0% |
| no $\mathcal{L}_c$ loss | 99.2% | 2.2 | 8.9% |
| no norm-pooling | 98.8% | 1.3 | 9.9% |
| no two-sided ReLU | 98.0% | 2.5 | 15.1% |

| $\epsilon$ | Model3 | Model4 |
|---|---|---|
| MNIST | 0.1 | 90.9% | 92.4% |
| MNIST | 0.3 | 7.0% | 44.0% |
| CIFAR-10 | 8/256 | 32.3% | 42.5% |

FIG. 8

| Rand | Ordinary network | | | | | L2NNN | | |
|---|---|---|---|---|---|---|---|---|
| | Vanilla | WD | DR | ES | WD+DR+ES | | Gap1 | Gap2 |
| 0 | 99.4% | 99.0% | 99.2% | 99.0% | 99.3% | 98.7% | 2.84 | 2.82 |
| 25% | 90.4% | 91.1% | 91.8% | 96.2% | 98.0% | 98.5% | 0.64 | 0.63 |
| 50% | 65.5% | 67.7% | 72.6% | 81.0% | 88.3% | 96.0% | 0.58 | 0.60 |
| 75% | 41.5% | 44.9% | 41.8% | 75.2% | 66.4% | 93.1% | 0.86 | 0.89 |
| 100% | 9.7% | 9.1% | 9.4% | NA | NA | 11.9% | 0.09 | 0.01 |

FIG. 9

| on training set | | on test set | |
|---|---|---|---|
| Accu. | Gap | Accu. | Gap |
| 98.7% | 0.17 | 79.0% | 0.12 |
| 96.5% | 0.21 | 79.3% | 0.18 |
| 89.4% | 0.22 | 86.3% | 0.20 |
| 70.1% | 0.36 | 93.4% | 0.37 |
| 66.1% | 0.45 | 93.7% | 0.47 |
| 59.8% | 0.58 | 96.0% | 0.60 |

FIG. 13

| Rand | Vanilla | Ordinary network | | | |
| --- | --- | --- | --- | --- | --- |
| | | WD | DR | ES | WD+DR+ES |
| 0 | 98.9% | 99.0% | 99.2% | 99.0% | 99.3% |
| 25% | 82.5% | 91.1% | 91.8% | 79.1% | 98.0% |
| 50% | 57.7% | 67.7% | 72.6% | 66.4% | 88.3% |
| 75% | 32.1% | 44.9% | 41.8% | 52.7% | 66.4% |
| 100% | 9.5% | 8.9% | 9.4% | NA | NA |

FIG. 14

| Rand | Vanilla | Ordinary network | | | |
|---|---|---|---|---|---|
| | | WD | DR | ES | WD+DR+ES |
| 0 | 99.4% | 99.0% | 99.0% | 99.0% | 99.0% |
| 25% | 90.4% | 86.5% | 89.8% | 96.2% | 90.3% |
| 50% | 65.5% | 62.5% | 63.7% | 81.0% | 83.1% |
| 75% | 41.5% | 38.2% | 40.2% | 75.2% | 61.9% |
| 100% | 9.7% | 9.1% | 8.8% | NA | NA |

FIG. 15

| on training set | | on test set | |
|---|---|---|---|
| Accu. | Gap | Accu. | Gap |
| 99.6% | 0.12 | 92.6% | 0.10 |
| 97.6% | 0.20 | 95.7% | 0.17 |
| 78.6% | 0.31 | 98.2% | 0.30 |
| 77.2% | 0.64 | 98.5% | 0.63 |

FIG. 16

| on training set | | on test set | |
|---|---|---|---|
| Accu. | Gap | Accu. | Gap |
| 97.9% | 0.07 | 49.8% | 0.03 |
| 93.0% | 0.09 | 59.2% | 0.05 |
| 75.9% | 0.10 | 70.0% | 0.08 |
| 58.0% | 0.18 | 80.4% | 0.17 |
| 46.2% | 0.29 | 86.8% | 0.30 |
| 40.1% | 0.44 | 89.8% | 0.46 |
| 34.7% | 0.86 | 93.1% | 0.89 |

L2-NONEXPANSIVE NEURAL NETWORKS

CROSS REFERENCE TO RELATED APPLICATIONS

The present application is a related Application of co-pending U.S. patent application Ser. No. 16/266,761, and co-pending U.S. patent application Ser. No. 16/266,751, each of which is filed concurrently herewith, the entire contents of which are incorporated herein by reference.

BACKGROUND

The present invention relates generally to a training method, and more particularly, but not by way of limitation, to a system, method, and computer program product for a class of well-conditioned neural networks in which a unit amount of change in the inputs causes at most a unit amount of change in the outputs or any of the internal layers.

Conventionally, artificial neural networks are often ill-conditioned systems in that a small change in the inputs can cause significant changes in the outputs. This results in poor robustness and vulnerability under adversarial attacks, which has been reported on a variety of networks including image classification, speech recognition, image captioning, and natural language processing (NLP). These issues bring up both theoretical questions of how neural networks generalize and practical concerns of security in applications.

SUMMARY

Based on the above, the inventors have identified a different approach to solve the conventional problem and demonstrate that a combination of the Lipschitz constant of a network from inputs to logits is no greater than 1 with respect to the L2-norm, the loss function explicitly maximizes confidence gap, which is the difference between the largest and second largest logits of a classifier, and the network architecture restricts confidence gaps as little as possible results in enhanced robustness.

In an exemplary embodiment, the present invention provides a computer-implemented training method for an L2 non-expansive neural network, the method including training a neural network including using two-sided RELU as a non-linear function and increasing a confidence gap and further training such that the network comprises a non-expansive network.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a training method 100 according to an embodiment of the present invention;

FIG. 3 exemplarily depicts accuracies of modified National Institute of Standards and Technology (MNIST) classifiers under white-box non-targeted attacks with noise L2-norm limit of 3;

FIG. 4 exemplarily depicts accuracies of Canadian Institute for Advanced Research (CIFAR-10) classifiers under white-box non-targeted attacks with noise L2-norm limit of 1.5;

FIG. 5 exemplarily depicts results from a MNIST model without weight regularization according to an embodiment of the present invention;

FIG. 8 exemplarily depicts an accuracy comparison of MNIST classifiers that are trained on noisy data according to an embodiment of the present invention;

FIG. 9 exemplarily depicts training-accuracy-versus-confidence-gap trade-offpoints of L2NNNs on 50%-scrambled MNIST training labels according to an embodiment of the present invention;

FIG. 13 exemplarily depicts accuracies of non-L2NNN MNIST classifiers that use a 4-layer architecture and that are trained on training data with various amounts of scrambled labels according to an embodiment of the present invention;

FIG. 14 exemplarily depicts accuracies of non-L2NNN MNIST classifiers that use a 22-layer architecture and that are trained on training data with various amounts of scrambled labels according to an embodiment of the present invention;

FIG. 15 exemplarily depicts training-accuracy-versus-confidence-gap trade-offpoints of L2NNNs on 25%-scrambled MNIST training labels according to an embodiment of the present invention;

FIG. 16 exemplarily depicts training-accuracy-versus-confidence-gap trade-off points of L2NNNs on 75%-scrambled MNIST training labels according to an embodiment of the present invention;

DETAILED DESCRIPTION

Figure 2:
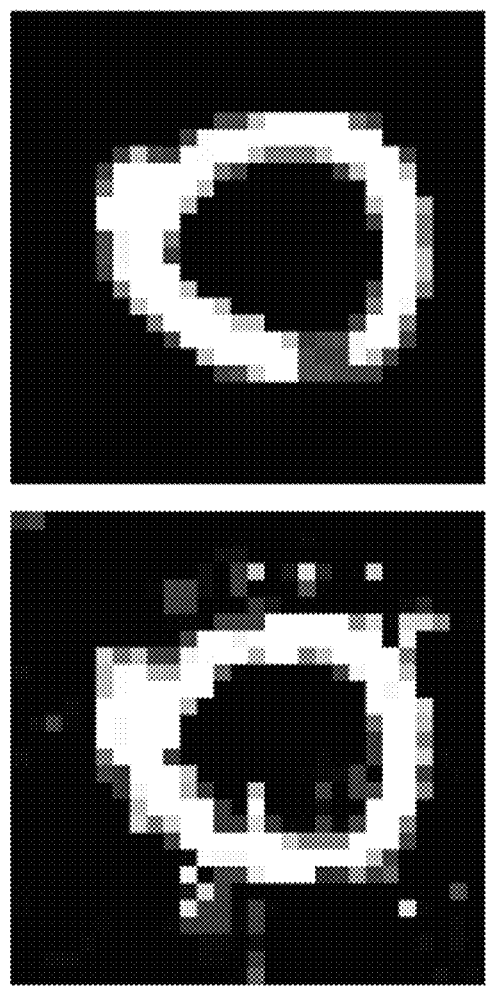
FIG. 2 exemplarily depicts an exemplary attack on a model found after 1,000 and 10,000 iterations according to an embodiment of the present invention.
Figures 6, 7:
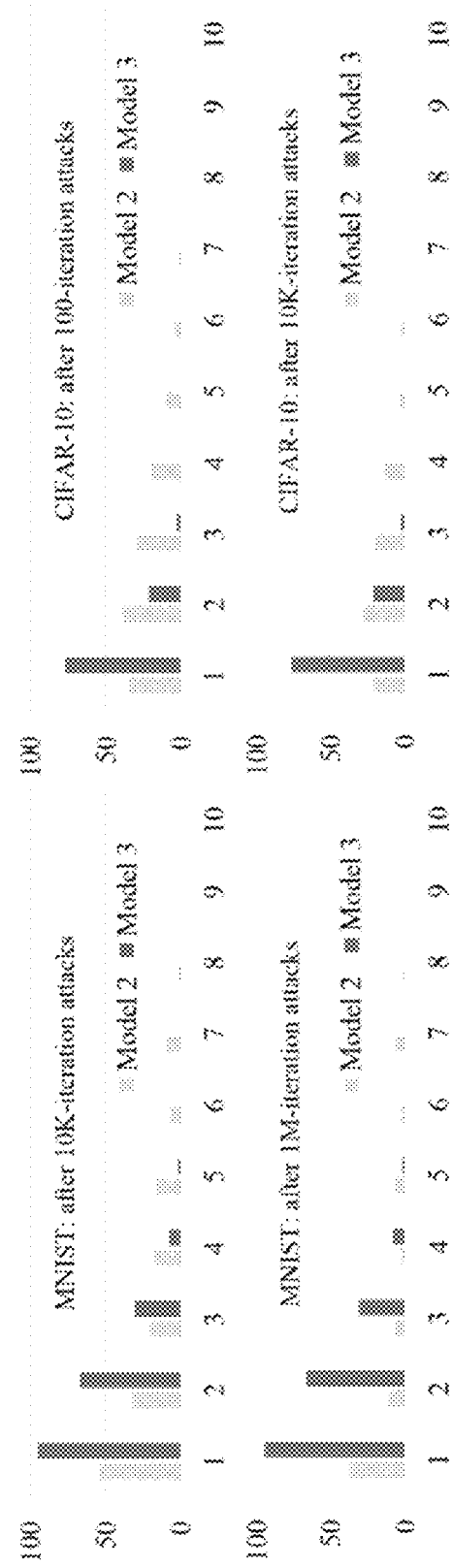
FIG. 6 exemplarily depicts an accuracy of L2NNN classifiers under white-box non-targeted attacks with 1000 iterations and with noise L∞-norm limit of $\varrho$ according to an embodiment of the present invention.
FIG. 7 exemplarily depicts accuracy percentages of classifiers on test data bin-sorted by the confidence gap according to an embodiment of the present invention.

The invention will now be described with reference to FIGS. 1-22, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a training method 100 according to the present invention can include various steps for enhancing robustness of a neural network.

It is noted that an L2-non-expansive neural network (L2NNN) is by definition a well-conditioned system in that a unit amount of change in the inputs causes at most a unit amount of change in the outputs or any of the internal layers.

Figure 20:
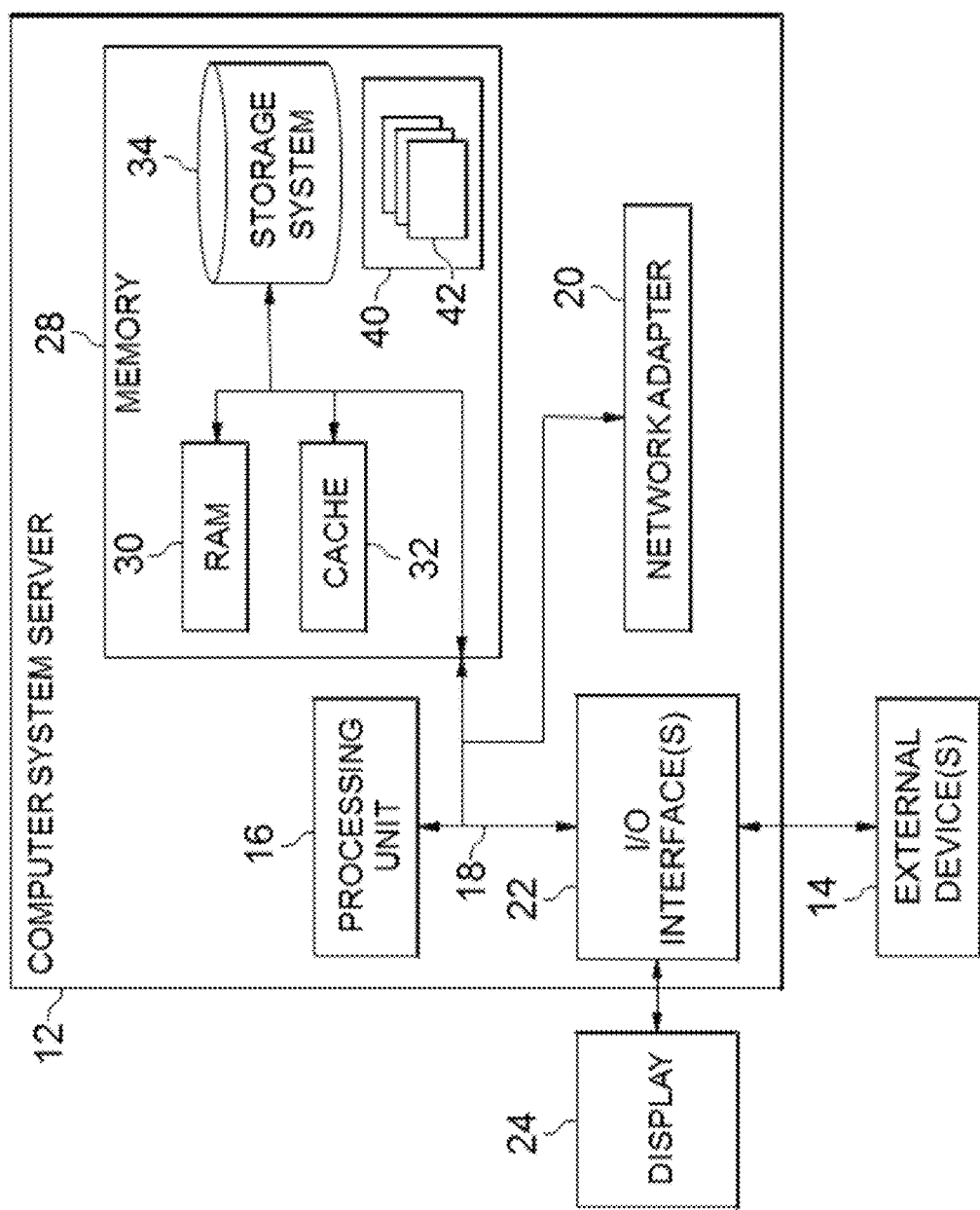
FIG. 20 depicts a cloud-computing node 10 according to an embodiment of the present invention.

By way of introduction of the example depicted in FIG. 20, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 21), it is nonetheless understood that the present invention can be implemented outside of the cloud environment.

With reference to FIG. 1, in step 101, a neural network is trained including using two-sided RELU as a non-linear function or norm-pooling as a non-linear function (e.g., one of) and increasing a confidence gap.

With reference generally to FIGS. 1-19, a neural network is trained including any two of controlling a Lipschitz constant, a network with two-faced RELU, a network with norm-pooling, and a loss function that grows faster than cross-entropy does. That is, the invention includes a different approach and demonstrates that a combination of the Lipschitz constant of a network from inputs to logits is no greater than '1' with respect to the L2-norm (i.e., a first condition), the loss function explicitly maximizes a confidence gap, which is the difference between the largest and second largest logits of a classifier (i.e., a second condition), and the network architecture restricts confidence gaps as little as possible which enhances robustness (i.e., a third condition).

Although a two-sided ReLU is discussed in detail below, the invention can include a multi-sided ReLU (i.e., two or more sided) as a generalization of a two-sided ReLU. In a two-sided RELU, the invention computes ReLU of x and −x. Said another way, the invention computes min(x, 0) and max(x, 0). A generalization is to have three outputs 1) if $x<c\_1$ where x is produced, otherwise $c\_1$, 2) if $c\_1<=x<c\_2$ x is produced and otherwise if $x<c1$, and produce c1 and otherwise $c\_2$ and 3) if $x<c\_2$, $c\_2$ is produced and otherwise x. The basic point of this is that rather than breaking the number range into two intervals, as in the two sided-ReLU and having only one of the two values change as the input changes within that range, the invention has many intervals and the same number of outputs but only one of those outputs changes as the input changes provided that the input stays within the appropriate interval.

In other words, a function f(x) from R to $R^n$, where n>=2, is called a multi-sided ReLU if and only if both these conditions hold. There exists a division of R into n intervals such that, within each interval, exactly one of f(x)'s outputs is not constant. There exist $y\_1, y\_2, \ldots, y\_n$ such that they are either +1 or −1 and that $y\_1*f\_1(x)+ \ldots +y\_n*f\_n(x)=x$.

The invention builds MNIST and CIFAR-10 classifiers, without needing any adversarial training, which exceed the state of the art in robustness against white-box L2-bounded adversarial attacks. The defense is even stronger if adversarial training is added. It is noted that these networks are referred to as 'L2-non-expansive neural networks' (L2NNNs). One exemplary advantage comes from a set of new techniques in the invention in which include a weight regularization, which enforces the first condition, allows greater degrees of freedom in parameter training, a new loss function that is specially designed for the second condition, and various layers are adapted in new ways for the third condition, for example norm-pooling and two-sided ReLU.

To explain the invention, intuitions behind the second and third conditions are first considered. Indeed, consider a multi-class classifier. Let g(x) denote its confidence gap for an input data point x. If the classifier is a single L2NNN (or preferably multiple L2NNNs), then there is a guarantee (i.e., 'Lemma 1' discussed below) that the classifier will not change its answer as long as the input x is modified by no more than an L2-norm of $g(x)/\sqrt{2}$ ($g(x)/2$ in case of multi-L2NNN classifier).

Therefore, maximizing the average confidence gap directly boosts robustness and this motivates the second condition. To explain the third condition, the notion of preserving distance is introduced (i.e., the distance between any pair of input vectors with two different labels ought to be preserved as much as possible at the outputs, while the invention does not care about the distance between a pair with the same label). As such, let d $(x_1, x_2)$ denote the L2-distance between the output logit-vectors for two input points x and x that have different labels and that are classified correctly. It is straightforward to verify the condition of $g(x1)+g(x2) \leq \sqrt{2} \cdot d(x_1, x_2)$ (e.g., as shown below in 'Lemma 2').

Therefore, a network that maximizes confidence gaps well must be one that preserves distance well. Ultimately, some distances are preserved while others are lost, and ideally the decision of which distance to lose is made by parameter training rather than by artifacts of network architecture. Hence, the third condition involves distance-preserving architecture choices that leave the decision to parameter training as much as possible.

In the implementation of the invention, the invention employs the strategy of 'divide and conquer' and builds each layer as a non-expansive map with respect to the L2-norm. It is straightforward to see that a feedforward network composed of non-expansive layers must implement a non-expansive map overall. How to adapt subtleties like recursion and splitting-re-convergence is described later.

Moreover, besides being robust against adversarial noises, L2NNNs have other desirable properties that are utilized by the invention. The L2NNNs generalize better from noisy training labels than ordinary networks. For example, when 75% of MNIST training labels are randomized, an L2NNN still achieves 93.1% accuracy on the test set, in contrast to 75.2% from the best ordinary network. The problem of exploding gradients, which is common in training ordinary networks, is avoided because the gradient of any output with respect to any internal signal is bounded between '−1' and '1'. Unlike ordinary networks, the confidence gap of an L2NNN classifier is a quantitatively meaningful indication of confidence on individual data points, and the average gap is an indication of generalization.

The method 100 adapts some individual operators in neural networks for L2NNNs. Discussions on splitting-reconvergence, recursion and normalization are described later.

Described below is both the matrix-vector multiplication in a fully connected layer and the convolution calculation between input tensor and weight tensor in a convolution layer.

The convolution calculation can be viewed as a set of vector-matrix multiplications. The invention makes shifted copies of the input tensor and shuffles the copies into a set of small vectors such that each vector contains input entries in one tile and the invention reshapes the weight tensor into a matrix by flattening all but the dimension of the output filters. Then, a convolution is equivalent to multiplying each of the small vectors with the flattened weight matrix. Therefore, in both cases, a basic operator is y=Wx. To be a non-expansive map with respect to the L2-norm, a necessary and sufficient condition is shown in equation (1) where p denotes the spectral radius of a matrix:

$$y^T y \leq x^T x \Rightarrow x^T W^T W x \leq x^T x, \forall x \in \mathbb{R}^N \rho(W^T W) \leq \quad (1)$$

The exact condition of equation (1) is difficult to incorporate into training. Instead, the invention uses an upper bound (e.g., the spectral radius of a matrix is no greater than its natural L∞-norm). $W^T W$ and $WW^T$ have the same non-zero eigenvalues and hence the same spectral radius) as shown in equation (2):

$$\rho(W^T W) \leq b(W) \triangleq \min(r(W^T W), r(WW^T)), \quad (2)$$
$$\text{where } r(M) = \max_i \sum_j |M_{i,j}|$$

Equation (2) is where the inventive linear and convolution layers differ from those in the conventional techniques because they require $WW^T$ to be an identity matrix, and it is straightforward to see that conventional techniques are only one special case that makes b (W) equal to 1. Instead of forcing filters to be orthogonal to each other, the invention bounds of b (W) provides parameter training with greater degrees of freedom (i.e., via summing matrix norms).

The invention uses equation (2) by replacing W with $W'=W/\sqrt{(b(W))}$ in weight multiplications, and this would enforce that the layer is strictly non-expansive. Another technique is described later.

As mentioned, convolution can be viewed as a first layer of making copies and a second layer of vector-matrix multiplications. With the above regularization, the multiplication layer is non-expansive. Hence, the invention only needs to ensure that the copying layer is non-expansive. For filter size of $K_1$ by $K_2$ and strides of $S_1$ and $S_2$, the input tensor is divided by a factor of $\sqrt{\lceil K_1/S_1 \rceil \cdot \lceil K_2/S_2 \rceil}$.

For a fully-connected layer or a convolution layer to satisfy the first condition, equation (1) is a necessary and sufficient condition. Equation (1) states that a certain property of this layer, namely a spectral radius of the product of this layer's weight matrix and its transpose, is no greater than 1. There are multiple ways to achieve equation (1), and some are less computational than others. For example, if a method to achieve equation (1) overly constrains the weight matrix, then this layer will not do much useful work. One example of a really low computational method is dividing the matrix by a large number. Another example, which is less computational, is the Parseval Network. The invention is smarter than Parseval Networks and is less restrictive on the layer. The invention finds an upper surrogate for the spectral radius, namely equation (2), and then divides the weight matrix by the square root of equation (2). It has an alternative form as described later.

Indeed, techniques may include a non-expansive network. This is achieved with the Parseval network by letting W be the weight matrix. But, this was also only achieved by also requiring the product of W and $W^T$ to be ortho-normal. The invention also considers a non-expansive but not orthonormal network. This is achieved by measuring a matrix norm of $WW^T$.

In another embodiment, the weight of the matrix can be combined with other techniques such as by using Norm-pooling, using Concatenated ReLU, and using training to increase the confidence gap. Preferably, the invention combines the weight of the matrix with one of the other techniques.

With reference to ReLU, ReLU, tanh and sigmoid are non-expansive but do not preserve distance well. Below presents a technique of the invention that improves ReLU and is generalizable to other nonlinearities. A different approach to improve sigmoid is shown later.

To understand the weakness of ReLU, two input data points A and B are considered, and suppose that a ReLU in the network receives two different negative values for A and B and outputs zero for both. Comparing the A-B distance before and after this ReLU layer, there is a distance loss and this particular ReLU contributes to it. The invention use two-sided ReLU which is a function from R to $R^2$ and computes ReLU(x) and ReLU(−x). Two sided ReLU is non-expansive with respect to any Lp-norm and it preserves distance in the above scenario. Its effectiveness is verified later in increasing confidence gaps. Two-sided ReLU is a special case of the following general technique. Let f(x) be a non-expansive and monotonically increasing scalar function, and note that ReLU, tanh and sigmoid all fit these conditions. The invention can define a function from R to $R^2$ that computes f(x) and f(x)−x (i.e., see 'Lemma 4' later in description). Such a new function is non-expansive with respect to any Lp-norm and preserves distance better than f(x) alone.

With reference to pooling (e.g., as exemplarily shown in FIG. 17), max-pooling is non-expansive, but does not preserve distance as much as possible. For example, consider a scenario where the inputs to pooling are activations that represent edge detection, and consider two images A and B such that A contains an edge that passes a particular pooling window while B does not. Inside this window, A has positive values while B has all zeroes. For this window, the A-B distance before pooling is the L2-norm of A's values, yet if max-pooling is used, the A-B distance after pooling becomes the largest of A's values, which can be substantially smaller than the former. Thus, there is a loss of distance between A and B while passing this pooling layer.

The invention replaces max-pooling with norm-pooling. Instead of taking the max of values inside a pooling window, the invention takes the L2-norm of them. Norm-pooling is non-expansive as shown in 'Lemma 5' and would entirely preserve the L2-distance between A and B in the hypothetical scenario above. Other Lp-norms can also be used.

If pooling windows overlap, then the invention divides the input tensor by √K where K is the maximum number of pooling windows in which an entry can appear, similar to convolution layers discussed earlier.

With reference to using a loss function (e.g., see FIG. 19) to increase the confidence gap, for a classifier with K labels, the invention includes building it as K overlapping L2NNNs, each of which outputs a single logit for one label. In an architecture with no split layers, this simply implies that these K L2NNNs share all but the last linear layer and that the last linear layer is decomposed into K single-output linear filters, one in each L2NNN. For a multi-L2NNN classifier, the invention has a guarantee (e.g., see 'Lemma 6' below) that the classifier will not change its answer as long as the input x is modified by no more than an L2-norm of $g(x)/2$, where again $g(x)$ denotes the confidence gap. As mentioned above, a single-L2NNN classifier has a guarantee of $g(x)/\sqrt{2}$. Although this seems better on the surface, it is more difficult to achieve large confidence gaps. Therefore, the invention will assume the multi-L2NNN approach.

The invention uses a loss function with three terms as shown in equation (3)-(6), with trade-off hyperparameters $\gamma$ and $\omega$ where z is a hyperparameter:

$$\mathcal{L} = \mathcal{L}_a + \gamma \cdot \mathcal{L}_b + \omega \cdot \mathcal{L}_c \quad (3)$$

Let $y_1, y_2, \ldots, y_K$ be outputs from the L2NNNs. The first loss term is $$\mathcal{L}_a = \text{softmax-cross-entropy}(u_1 y_1, u_2 y_2, \ldots, u_K y_K, \text{label}) \quad (4)$$

where $u_1, u_2, \ldots, u_K$ are trainable parameters. The second loss term is $$\mathcal{L}_b = \text{softmax-cross-entropy}(v y_1, v y_2, \ldots, v y_K, \text{label}) \quad (5)$$

where v can be either a trainable parameter or a hyperparameter. Note that $u_1, u_2, \ldots, u_K$ and v are not part of the classifier and are not used during inference. The third loss term is $$\mathcal{L}_c = \frac{\text{average }(\log(1 - \text{softmax}(z y_1, z y_2, \ldots, z y_K)_{label}))}{z} \quad (6)$$

The rationale for the first loss term (4) is that it mimics cross-entropy loss of an ordinary network. If an ordinary network has been converted to L2NNNs by multiplying each layer with a small constant, then its original outputs can be recovered by scaling up L2NNN outputs with certain constants, which is enabled by the formula (4). Hence, this loss term is meant to guide the training process to discover any feature that an ordinary network can discover. The rationale for the second loss term (5) is that it is directly related to the classification accuracy.

Multiplying L2NNN outputs uniformly with v does not change the output label and only adapts to the value range of L2NNN outputs and drive towards better nominal accuracy. The third loss term (6) approximates average confidence gap: the log term is a soft measure of a confidence gap (for a correct prediction), and is asymptotically linear for larger gap values. The hyperparameter z controls the degree of softness, and has relatively low impact on the magnitude of loss due to the division by z; if z is increased then (6) asymptotically becomes the average of minus confidence gaps for correct predictions and zeroes for incorrect predictions. Therefore, loss (6) encourages large confidence gaps and yet is smooth and differentiable.

A notable variation of equation (3) is one that combines with adversarial training. The invention applies a technique on equation (4) and uses distorted inputs in calculating $L_a$. These results are exemplarily shown in FIGS. 3-4.

Adversarial training means replacing the original training data points with distorted data points. The distorted data points are found by an adversarial attacker and are such that the current model gives wrong answers. When combining the invention with adversarial training, the invention has a choice: either use only distorted data points or use both original training data points and distorted data points. Experiments found that it is benificial to use both because of better results: Le is based on original training data points, while La and/or Lb are based on distorted data points.

Thereby, the method 100 includes L2-non-expansive neural networks which are well-conditioned systems by construction. Practical techniques are developed for building these networks. Their properties are studied through experiments (below) and benefits demonstrated, including that the MNIST and CIFAR-10 classifiers exceed the state of the art in robustness against white-box adversarial attacks, that they are robust against partially random training labels, and that they output confidence gaps which are strongly correlated with robustness and generalization. There are a number of future directions, for example, other applications of L2NNN, L2NNN-friendly neural network architectures, and the relation between L2NNNs and interpretability.

Experimental Results

Experiments are divided into three groups to study different properties of L2NNNs.

To test robustness, the experiments ran evaluated robustness of L2NNN classifiers for MNIST and CIFAR-10 and compared against the state of the art Madry et al. (2017). The robustness metric is accuracy under white-box non-targeted L2-bounded attacks. The attack code of Carlini & Wagner (2017a) is used. The experiments downloaded the classifiers (i.e., at github.com/MadryLab/mnist_challenge and github.com/MadryLab/cifar10_challenge. These models (Model 2's in Tables 1 and 2) were built by adversarial training with L∞-bounded adversaries (Madry et al., 2017). Tsipras et al. (2019) from the same lab is the only paper in the literature that reports on models trained with L2-bounded adversaries, and it reports that training with L2-bounded adversaries resulted in weaker L2 robustness than the L2 robustness results from training with L∞-bounded adversaries in Madry et al. (2017). Therefore, the experiment choose to compare against the best available models, even though they were trained with L∞-bounded adversaries. Note also that the inventor's own Model 4's in Tables 1 and 2 are trained with the same L∞-bounded adversaries) of Madry et al. (2017) and report their robustness against L2-bounded attacks in FIG. 3.

It is noted that their defense diminishes as the attacks are allowed more iterations. FIG. 2 illustrates one example of this effect: the first image is an attack on MNIST Model 2 (0 recognized as '5') found after 1,000 iterations, with noise L2-norm of 4.4, while the second picture is one found after 10,000 iterations, the same '0' recognized as '5', with noise L2-norm of 2.1. It is hypothesized that adversarial training alone provides little absolute defense at the noise levels used in the two tables: adversarial examples still exist and are only more difficult to find. The fact that in FIG. 4, Model 2 accuracy is lower in the 1000×10 row than the 10,000 row further supports our hypothesis.

In contrast, the defense of the L2NNN models remains constant when the attacks are allowed more iterations, specifically MNIST Models beyond 10K iterations and CIFAR-10 Models beyond 1000 iterations. The reason is that L2NNN classifiers achieve their defense by creating a confidence gap between the largest logit and the rest, and that half of this gap is a lower bound of L2-norm of distortion to the input data in order to change the classification. Hence, L2NNN's defense comes from a minimum-distortion guarantee. Although adversarial training alone may also increase the minimum distortion limit for misclassification, as suggested in Carlini et al. (2017) for a small network, that limit likely does not reach the levels used in FIGS. 3-4 and hence the defense depends on how likely the attacker can reach a lower-distortion misclassification. Consequently, when the attacks are allowed to make more attempts the defense with guarantee stands while the other diminishes.

For both MNIST and CIFAR-10, adding adversarial training boosts the robustness of Model 4. It is hypothesized that adversarial training lowers local Lipschitz constants in certain parts of the input space, specifically around the training images, and therefore makes local robustness guarantees larger (Hein & Andriushchenko, 2017). To test this hypothesis on MNIST Models 3 and 4, the experiments measure the average L2-norm of their Jacobian matrices, averaged over the first 1000 images in the test set, and the results are 1.05 for Model 3 and 0.83 for Model 4. Note that the L2-norm of the Jacobian matrices can be greater than 1 for multi-L2NNN classifiers. These measurements are consistent with, but albeit do not prove, the hypothesis.

To test the effects of various components of the method 100, the experiments build models for each of which a different technique during training is disabled. The results are shown in FIG. 5. To put the confidence gap values in context, the inventive MNIST Model 3 has an average gap of 2.8. The first one is without weight regularization of the weights of the matrix norm and it becomes an ordinary network which has little defense against adversarial attacks (i.e., its large average confidence gap is meaningless). For the second one, the experiment removes the third loss term (6) and for the third one the experiment replaces norm-pooling with regular max-pooling, both resulting in a smaller average confidence gap and less defense against attacks. For the fourth one, the experiment replaces two-sided ReLU with regular ReLU, and this leads to degradation in nominal accuracy, average confidence gap and robustness. Parseval networks can be viewed as models without an Lc term, norm-pooling or two-sided ReLU, and with a more restrictive scheme for weight matrix regularization.

Model 3 in FIG. 3 and the second row of FIG. 4 are two points along a trade-off curve that are controllable by varying hyperparameter $\omega$ in loss function (3). Other trade-off points have nominal accuracy and under-attack accuracy of (98.8%, 19.1%), (98.4%, 22.6%) and (97.9%, 24.7%) respectively. Similar trade-offs have been reported by other robustness works including adversarial training and adversarial polytope.

Although the experiments primarily focus on defending against L2-bounded adversarial attacks, the method 100 achieves some level of robustness against L∞-bounded attacks as a by-product. FIG. 6 shows the results, again measured with the attack code of Carlini & Wagner (2017a). The $\varrho$ values match those used in Raghunathan et al. (2018); Kolter & Wong (2017); Madry et al. (2017). The MNIST L results are on par with Raghunathan et al. (2018); Kolter & Wong (2017) but not as good as Madry et al. (2017). The CIFAR-10 Model 4 is on par with Madry et al. (2017) for an L∞ defense.

With regard to meaningful outputs, it is now discussed how to understand and utilize L2NNNs' output values. The experiments observe strong correlation between the confidence gap of L2NNN and the magnitude of distortion needed to force it to misclassify (e.g., see FIGS. 10-12).

In the experiment, test data is sorted by the confidence gap of a classifier on each image. Then, the experiment divides the sorted data into 10 bins and report accuracy separately on each bin in FIG. 7. This experiment is repeated for Model 2 (Madry et al., 2017) and the Model 3 of FIGS. 3-4. It is noted that the L2NNN model shows better correlation between confidence and robustness. For MNIST, the first bin is 95% robust and the second bin is 67% robust. This indicates that the L2NNN outputs are much more quantitatively meaningful than those of ordinary neural networks.

It is an important property that an L2NNN has an easily accessible measurement on how robust its decisions are. Since robustness is easily measurable, it can be optimized directly, and this is the primary reason that the experiments can demonstrate the robustness results of FIGS. 3-4. This can also be valuable in real-life applications where we need to quantify how reliable a decision is. One of the other practical implications of this property is that the invention can form hybrid models which use L2NNN outputs when the confidence is relatively high (e.g., higher than a given threshold) and a different model when the confidence of the L2NNN is relatively low (e.g., lower than a given threshold). This creates another dimension of trade-off between nominal accuracy and robustness that one can take advantage of in an application. The invention built such a hybrid model for MNIST with the switch threshold of 1.0 and achieved nominal accuracy of 99.3%, where only 6.9% of images were delegated to the alternative classifier. And, the invention built such a hybrid model for CIFAR-10 with the switch threshold of 0.1 and achieved nominal accuracy of 89.4%, where 25% of images were delegated. To put these threshold values in context, MNIST Model 3 has an average gap of 2.8 and CIFAR-10 Model 3 has an average gap of 0.34. In other words, if for a data point the L2NNN confidence gap is substantially below average, then the classification is delegated to the alternative classifier, and, in this way the invention can recover nominal accuracy at a moderate cost of robustness.

With reference to results for generalization versus memorization tradeoff, experiments were run that study L2NNN's generalization through a noisy-data experiment where the experiments randomize some or all MNIST training labels. The setup is similar to Zhang et al. (2017), except that the experiments added three scenarios where 25%, 50% and 75% of training labels are scrambled.

FIG. 8 shows the comparison between L2NNNs and ordinary networks. Dropout rate and weight-decay weight are tuned for each WD/DR run, and each WD+DR+ES run uses the combined hyper-parameters from its row. In early-stopping runs, 5000 training images are withheld as validation set and training stops when loss on validation set stops decreasing. The L2NNNs do not use weight decay, dropout or early stopping. L2NNNs achieve the best accuracy in all three partially-scrambled scenarios, and it is remarkable that an L2NNN can deliver 93.1% accuracy on test set when three quarters of training labels are random. More detailed data and discussions are later.

To illustrate why L2NNNs generalize better than ordinary networks from noisy data, FIG. 9 shows trade-offpoints between accuracy and confidence gap on the 50% scrambled training set. These trade-offpoints are achieved by changing hyperparameters $\omega$ in (3) and $\nu$ in (5). In a noisy training set, there exist data points that are close to each other yet have different labels. For a pair of such points, if an L2NNN is to classify both points correctly, then the two confidence gaps must be small. Therefore, in order to achieve large average confidence gap, an L2NNN must misclassify some of the training data. In FIG. 9, as the experiment adjusts the loss function to favor larger average gap, the L2NNNs are forced to make more and more mistakes on the training set. The results suggest that loss is minimized when an L2NNN misclassifies some of the scrambled labels while fitting the 50% original labels with large gaps, and parameter training discovers this trade-off automatically. Hence, the experiments show in FIG. 9 increasing accuracies and gaps on the test set. The above is a trade-off between memorization (training-set accuracy) and generalization (training-set average gap), and it is hypothesized that L2NNN's trade-off between nominal accuracy and robustness, as shown above, is due to the same mechanism. Dropout and early stopping are also able to sacrifice accuracy on a noisy training set, however they do so through different mechanisms that tend to be brittle, and FIG. 8 suggests that L2NNN's mechanism is superior. More discussions and the trade-off tables for 25% and 75% scenarios (e.g., as shown in FIGS. 15-16).

Another interesting observation is that the average confidence gap dramatically shrinks in the last row of FIG. 8 where the training is pure memorization. This is not surprising again, due to training data points that are close to each other yet have different labels. The practical implication is that after an L2NNN model is trained, one can simply measure its average confidence gap to know whether and how much it has learned to generalize rather than to memorize the training data.

L2-Non-Expansive Network Components

The method 100 can include different techniques for weight regularization. For example, there are numerous ways to utilize the bound of (2). The main text describes a simple method of $W'=W\sqrt{(b(W))}$ to enforce strict non-expansiveness. The following is an alternative. Approximate non-expansiveness can be achieved by adding a penalty to the loss function whenever $b(W)$ exceeds 1, for example of equation (7):

$$\mathcal{L}_W = \min(l(W^T W), l(W W^T)), \quad (7)$$

$$\text{where } l(M) = \sum_i \max\left(\sum_j |M_{i,j}| - 1, 0\right)$$

The sum of (7) losses over all layers becomes a fourth term in the loss function (3), multiplied with one additional hyperparameter. This would lead to an approximate L2NNN with trade-offs between how much its layers violate (1) with surrogate (2) versus other objectives in the loss function.

In practice, it is found that it is beneficial to begin neural network training with the regularization scheme of (7), which allows larger learning rates, and switch to the first scheme of using W', which avoids artifacts of an extra hyperparameter, when close to convergence. Of course, if the goal is building approximate L2NNNs, then one can use (7) all the way.

For sigmoids and others, a sigmoid is non-expansive as is, but does not preserve distance as much as possible. A better way is to replace sigmoid with the following operator of equation (8):

$$s(x) = t \cdot \text{sigmoid}\left(\frac{4x}{t}\right) \quad (8)$$

where $t>0$ is a trainable parameter and each neuron has its own t. In general, the requirement for any scalar nonlinearity is that its derivative is bounded between '−1' and '1'. If a nonlinearity violates this condition, then a shrinking multiplier can be applied. If the actual range of derivative is narrower, as in the case of sigmoid, then an enlarging multiplier can be applied to preserve distance.

For further improvement, (8) can be combined with the general form of the two-sided ReLU. Then the new nonlinearity is a function from R to $R^2$ that computes $s(x)$ and $s(x)-x$.

Figure 18:
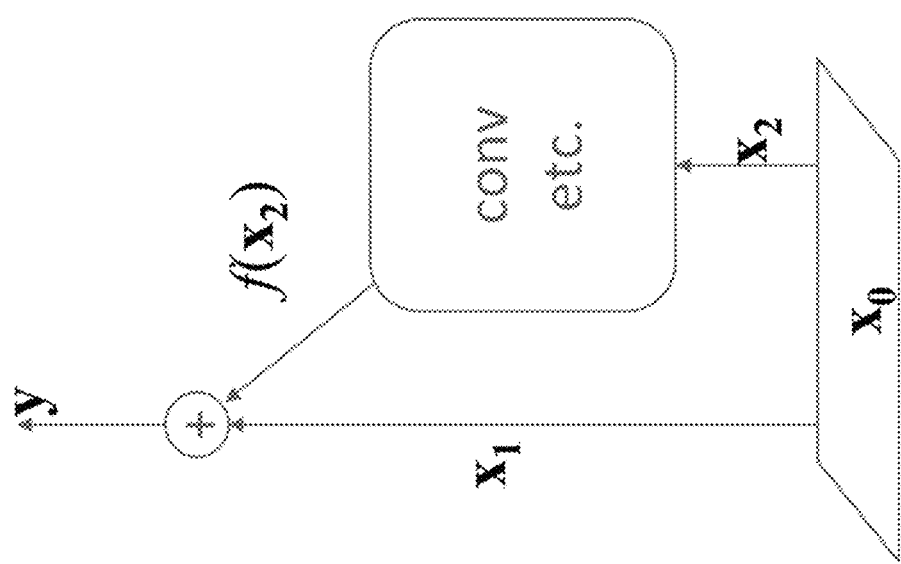
FIG. 18 exemplarily depicts splitting and re-convergence according to an embodiment of the present invention.
Figure 19:
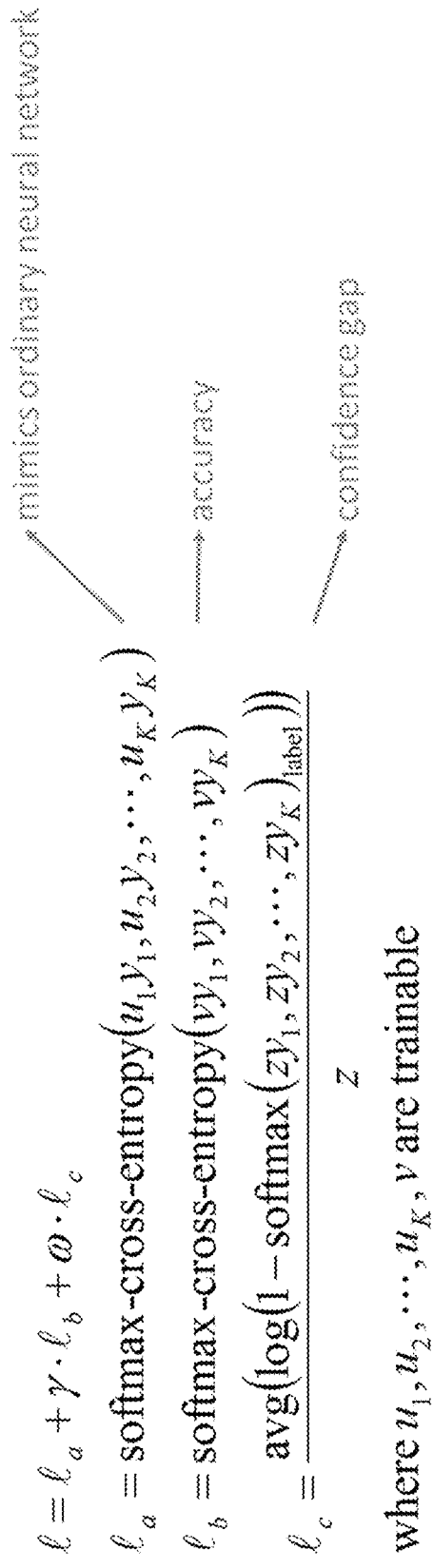
FIG. 19 exemplarily depicts a loss function according to an embodiment of the present invention.

With regards to splitting and convergence (e.g., as shown in FIG. 18), there are different kinds of splitting in neural networks. Some splitting is not followed by re-convergence. For example, a classifier may have common layers followed by split layers for each label, and such an architecture can be viewed as multiple L2NNNs that overlap at the common layers and each contain one stack of split layers. In such cases, no modification is needed because there is no splitting within each individual L2NNN.

Some splitting, however, is followed by re-convergence. In fact, convolution and pooling layers discussed earlier can be viewed as splitting, and re-convergence happens at the next layer. Another common example is skip-level connections such as in ResNet. Such splitting should be viewed as making two copies of a certain vector. Let the before-split vector be x0, and one makes two copies as equation (9):

$$x_1 = t \cdot x_0, x_2 = \sqrt{1-t^2} \cdot x_0 \quad (9)$$

where $t \in [0, 1]$ is a trainable parameter.

In the case of ResNet, the re-convergence is an add operator, which should be treated as vector-matrix multiplication as in the above weight descriptions, but with much simplified forms. Let $x_1$ be the skip-level connections and $f(x_2)$ be the channels of convolution outputs to be added with $x_1$, and this is performed as the addition as:

$$y = t \cdot x_1 + \sqrt{1-t^2} \cdot f(x_2) \quad (10)$$

where $t \in [0, 1]$ is a trainable parameter and could be a common parameter with (9).

ResNet-like re-convergence is referred to as aggregation layers in Cisse et al. (2017) and a different formula (11) was used as:

$$y = \alpha \cdot x_1 + (1-\alpha) \cdot f(x_2) \quad (11)$$

In (11), $\alpha \in [0, 1]$ is a trainable parameter. Because splitting is not modified in Cisse et al. (2017), their scheme may seem approximately equivalent to the invention if a common t parameter is used for (9) and (10). However, there is a substantial difference: in many ResNet blocks, $f(x_2)$ is a subset of rather than all of the output channels of convolution layers, and our scheme does not apply the shrinking factor of $\sqrt{1-t^2}$ on channels that are not part of $f(x_2)$ and therefore better preserve distances. In contrast, because splitting is not modified in the invention, at re-convergence the scheme of Cisse et al. (2017) must apply the shrinking factor of $1-\alpha$ on all outputs of convolution layers, regardless of whether a channel is part of the aggregation or not. To state the difference in more general terms, the inventive scheme enables splitting and re-convergence at arbitrary levels of granularity and multiplies shrinking factors to only the necessary components. It is noted that the invention can also have a different t per channel or even per entry.

For recursion, there are multiple ways to interpret recurrent neural networks (RNN) as L2NNNs. One way is to view an unrolled RNN as multiple overlapping L2NNNs where each L2NNN generates the output at one time step. Under this interpretation, nothing special is needed and recurrent inputs to a neuron are simply treated as ordinary inputs.

Another way to interpret an RNN is to view unrolled RNN as a single L2NNN that generates outputs at all time steps. Under this interpretation, recurrent connections are treated as splitting at their sources and should be handled as in (9).

For normalization, normalization operations are limited in an L2NNN. Subtracting mean is allowed, and the subtract-mean operation can be performed on arbitrary subsets of any layer. Subtracting batch mean is also allowed because it can be viewed as subtracting a bias parameter. However, scaling (e.g., division by standard deviation or batch standard deviation) is only allowed if the multiplying factors are no greater than 1.

Figure 10:
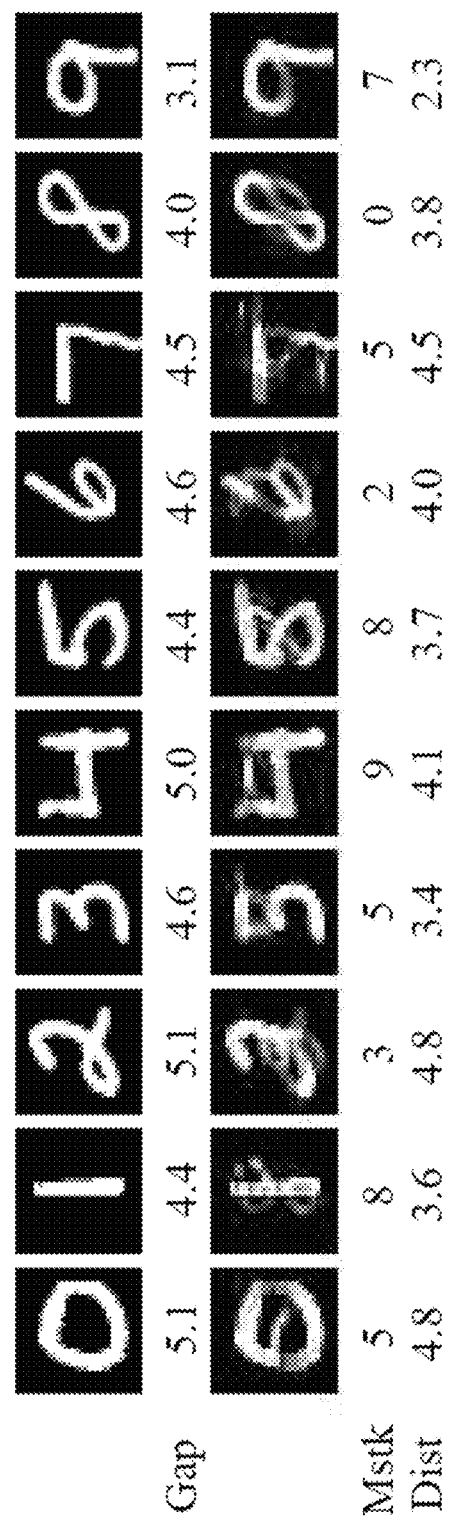
FIG. 10 exemplarily depicts original and distorted images of MNIST digits in test set with the largest confidence gaps according to an embodiment of the present invention.
Figure 11:
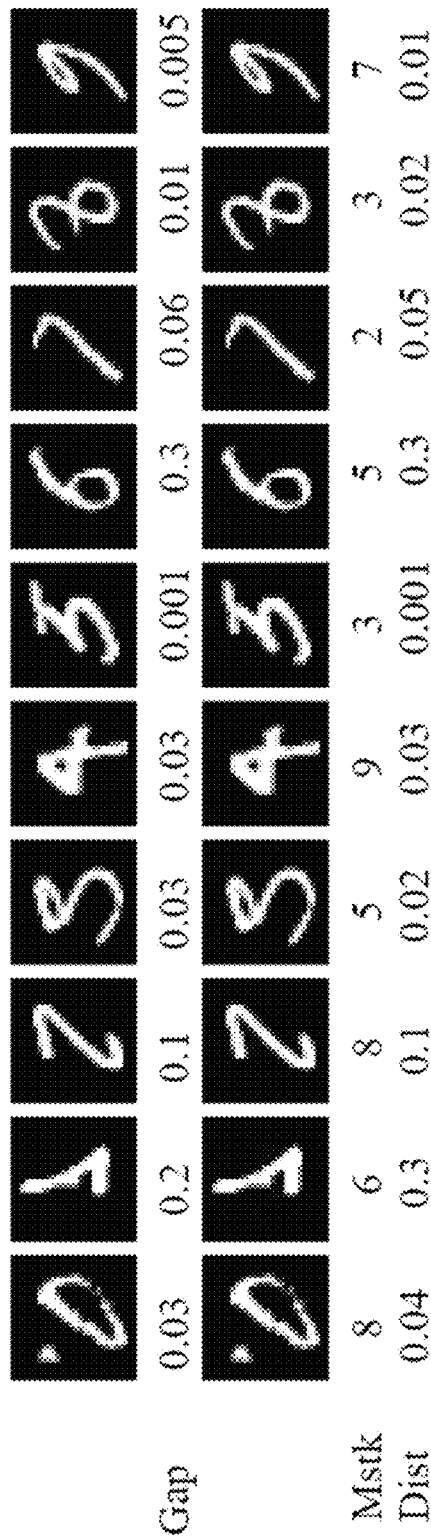
FIG. 11 exemplarily depicts original and distorted images of MNIST digits in test set with the smallest confidence gaps according to an embodiment of the present invention.

For example, with MNIST images, MNIST images with the largest confidence gaps are shown in FIG. 10 and those with the smallest confidence gaps in FIG. 11. They include images before and after attacks as well as Model 3's confidence gap, the misclassified label and L2-norm of the added noise. The images with large confidence gaps seem to be ones that are most different from other digits, while some of the images with small confidence gaps are genuinely ambiguous. It is worth noting the strong correlation between the confidence gap of L2NNN and the magnitude of distortion needed to force it to misclassify. Also, it is noted that the invention guarantees states that the minimum L2-norm of noise is half of the confidence gap, but in reality the needed noise is much stronger than the guarantee. The reason is that the true local guarantee is in fact larger due to local Lipschitz constants.

Figure 12:
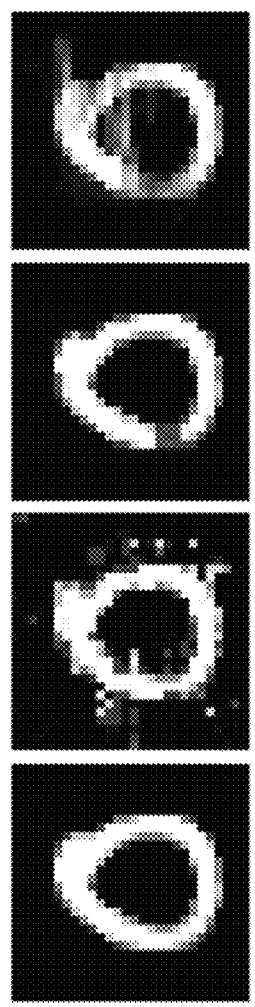
FIG. 12 exemplarily depicts a misclassification of '5' according to some techniques.
Figure 17:
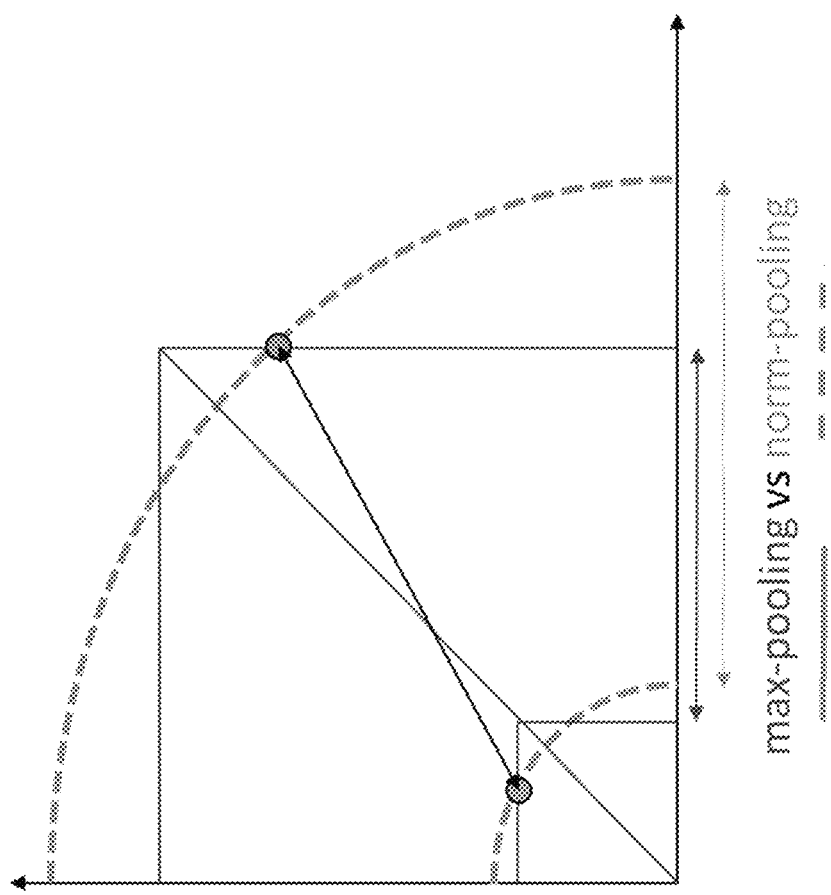
FIG. 17 exemplarily depicts pooling according to an embodiment of the present invention.

FIG. 12 shows additional details regarding the example in FIG. 2. The first image is the original image of a zero. The second image is an attack on Model 2 (Madry et al., 2017) found after 1,000 iterations, with noise L2-norm of 4.4. The third is one found after 10,000 iterations for Model 2, with noise L2-norm of 2.1. The last image is the best attack on the Model 3 found after one-million iterations, with noise L2-norm of 3.5. These illustrate the trend shown in FIG. 3 that the defense by adversarial training diminishes as the attacks are allowed more iterations, while L2NNNs with stand strong attacks and it requires more noise to fool an L2NNN. It is worth noting that the slow degradation of Model 2's accuracy is an artifact of the attacker (Carlini & Wagner, 2017a): when gradients are near zero in some parts of the input space, which is true for the MNIST Model 2 due to adversarial training, it takes more iterations to make progress. It is conceivable that, with a more advanced attacker, Model 2 could drop quickly to 7.6%. What truly matters are the robust accuracies where the inventors advance the state of the art from 7.6% to 24.4%.

Scrambled-Label Experiments

For ordinary networks in FIG. 8, two network architectures are used. The first has four layers. The second has 22 layers and is the architecture of Models 3 and 4 in FIG. 3, which includes norm-pooling and two-sided ReLU. Results of ordinary networks using these two architectures are in FIGS. 13-14, respectively. The ordinary-network section of FIG. 8 is an entry-wise max of FIGS. 13-14.

In FIGS. 13-14, dropout rate and weight-decay weight are tuned for each WD/DR run, and each WD+DR+ES run uses the combined hyperparameters from its row. In early-stopping runs, 5000 training images are withheld as validation set and training stops when loss on validation set stops decreasing. Each ES or WD+DR+ES entry is an average over ten runs to account for randomness of the validation set. The L2NNNs do not use weight decay, dropout or early stopping.

FIG. 15 shows L2NNN trade-off points between an accuracy and a confidence gap on the 25%-scrambled training set. FIG. 16 shows L2NNN trade-offpoints between an accuracy and a confidence gap on the 75%-scrambled training set. Like FIG. 9, they demonstrate the trade-off mechanism between a memorization (training-set accuracy) and a generalization (training-set average gap).

It is noted that dropout and early stopping are also able to sacrifice accuracy on a noisy training set. For example, the DR run in the 50%-scrambled row in FIG. 13 has 67.5% accuracy on the training set and 72.6% on the test set. However, the underlying mechanisms are very different from that of L2NNN. Dropout has an effect of data augmentation, and, with a noisy training set, dropout can create a situation where the effective data complexity exceeds the network capacity. Therefore, the parameter training is stalled at a lowered accuracy on the training set, and the invention gets better performance if the model tends to fit more of original labels and less of the scrambled labels. The mechanism of early stopping is straightforward and simply stops the training when it is mostly memorizing scrambled labels. The invention gets better performance from early stopping if the parameter training tends to fit the original labels early. These mechanisms from dropout and early stopping are both brittle and may not allow parameter training enough opportunity to learn from the useful data points with original labels. The comparison in FIG. 8 suggests that they are inferior to L2NNN's trade-off mechanism illustrated in FIGS. 9, 15, and 16. The L2NNNs in the invention do not use weight decay, dropout or early stopping. However, it is conceivable that dropout may be complementary to L2NNNs.

Proofs Including Lemmas

Lemma 1: let g (x) denote a single-L2NNN classifier's confidence gap for an input data point x. The classifier will not change its answer as long as the input x is modified by no more than an L2-norm of $g(x)/\sqrt{2}$.

Proof of Lemma 1: let $y(x)=[y1 (x), y2 (x), \ldots, yK (x)]$ denote logit vector of a single-L2NNN classifier for an input data point x. Let x1 and x2 be two input vectors such that the classifier outputs different labels i and j. By definitions, one has the following inequalities of (12):

$$Yi(x_1)-Yj(x_1) \geq g(x_1) Yi(x_2)-Yj(x_2) \leq 0 \tag{12}$$

Because the classifier is a single L2NNN, it must be true that (i.e., as shown in (13)):

$$\|x_2 - x_1\|_2 \geq \|y(x_2) - y(x_1)\|_2 \geq \tag{13}$$

$$\sqrt{(y_i(x_2) - y_i(x_1))^2 + (y_j(x_2) - y_j(x_1))^2} =$$

$$\sqrt{(y_i(x_1) - y_i(x_2))^2 + (y_j(x_2) - y_j(x_1))^2} \geq$$

$$\sqrt{\frac{(y_i(x_1) - y_i(x_2)) + (y_j(x_2) - y_j(x_1))^2}{2}} =$$

$$\sqrt{\frac{((y_i(x_1) - y_j(x_2)) + (y_j(x_2) - y_i(x_2)))^2}{2}} \geq \sqrt{\frac{(g(x_1) + 0)^2}{2}} =$$

$$g(x_1)/\sqrt{2}$$

Lemma 2: let g(x) denote a classifier's confidence gap for an input data point x. Let d $(x_1, x_2)$ denote the L2-distance between the output logit-vectors for two input points $x_1$ and $x_2$ that have different labels and that are classified correctly. Then this condition holds: $g(x1)+g(x2) \geq \sqrt{2} \cdot d(x_1, x_2)$.

Proof for Lemma 2: let $y(x)=[y1(x), y2(x), \ldots, yK(x)]$ denote logit vector of a classifier for an input data point x. Let i and j be the labels for $x_1$ and $x_2$. By definitions, there are the following inequalities of (14):

$$Yi(x_1)-Yj(x_1) \geq g(x_1) \; Yj(x_2)-Yi(x_2) \geq g(x_2) \qquad (14)$$

Therefore, it follows that (15) is true:

$$d(x_1, x_2) \geq \|y(x_2) - y(x_1)\|_2 \geq \qquad (15)$$

$$\sqrt{(y_i(x_2) - y_i(x_1))^2 + (y_j(x_2) - y_j(x_1))^2} =$$

$$\sqrt{(y_i(x_1) - y_i(x_2))^2 + (y_j(x_2) - y_j(x_1))^2} \geq$$

$$\sqrt{\frac{(y_i(x_1) - y_i(x_2)) + (y_j(x_2) - y_j(x_1))^2}{2}} =$$

$$\sqrt{\frac{((y_i(x_1) - y_j(x_2)) + (y_j(x_2) - y_i(x_2)))^2}{2}} \geq$$

$$\sqrt{\frac{(g(x_1) + g(x_2))^2}{2}} = \frac{g(x_1) + g(x_2)}{\sqrt{2}}$$

Lemma 3: for any $a \geq 0$, $b \geq 0$, $p \geq 1$, the following inequality holds: $a^p + b^p \leq (a+b)^p$.

Proof for Lemma 3: If a and b are both zero, then the inequality holds. If at least one of a and b is nonzero as in (16):

$$a^p + b^p = (a+b)^p \cdot \left(\frac{a}{a+b}\right)^p \cdot \left(\frac{a}{a+b}\right)^p + (a+b)^p \cdot \left(\frac{b}{a+b}\right)^p \leq \qquad (16)$$

$$(a+b)^p \cdot \frac{a}{a+b} + (a+b)^p \cdot \frac{b}{a+b} = (a+b)^p$$

Lemma 4: let f(x) be a non-expansive and monotonically increasing scalar function. Define a function from R to $R^2$: $h(x)=[f(x), f(x)-x]$. Then h(x) is non-expansive with respect to any $L_p$-norm.

Proof of Lemma 4: for any $x1>x2$, by definition there is the following inequalities of (17):

$$f(x_1)-f(x_2) \geq 0 \; f(x_1)-f(x_2) \leq x_1-x_2 \qquad (17)$$

And, for any $p \geq 1$, invoking Lemma 3 with $a=f(x_1)-f(x_2)$ and $b=x_1-x_2-f(x_1)+f(x_2)$, (18) is shown as:

$$((f(x_1)-f(x_2))^p+(x_1-x_2-f(x_1)+f(x_2))^p \leq (x_1-x_2)^p ((f(x_1)-f(x_2))^p+(x_1-x_2-f(x_1)+f(x_2))^p)^{1/p} \leq x_1-x_2 (|f(x_1)-f(x_2)|^p + |(f(x_1)-x_1)-(f(x_2)-x_2)|^p)^{1/p} \leq x_1-x_2 \|h(x_1)-h(x_2)\|_p \leq x_1-x_2 \qquad (18)$$

Lemma 5: norm-pooling within each pooling window is a non-expansive map with respect to L2-norm.

Proof of Lemma 5: Let $x_1$ and $x_2$ be two vectors with the size of a pooling window. By triangle inequality, (19) follows as:

$$\|x_1-x_2\|_2+\|x_1\|_2 \geq \|x_2\| \; \|x_1-x_2\|_2+\|x_2\|_2 \geq \|x_1\|_2 \qquad (19)$$

Therefore, $$\|x_1-x_2\|_2 \geq \|x_2\|_2-\|x_1\|_2 \; \|x_1-x_2\|_2 \geq \|x_1\|_2-\|x_2\|_2 \qquad (20)$$

Therefore, $$\|x_1-x_2\|_2 \geq |\|x_1\|_2-\|x_2\|_2| \qquad (21)$$

Lemma 6: let g (x) denote a multi-L2NNN classifier's confidence gap for an input data point x. The classifier will not change its answer as long as the input x is modified by no more than an L2-norm of g(x)/2.

Proof of Lemma 6: let $y(x)=[y_1(x), y_2(x), \ldots, y_K(x)]$ denote logit vector of a multi-L2NNN classifier for an input data point x. Let $x_1$ and $x_2$ be two input vectors such that the classifier outputs different labels i and j. By definitions, one has the following inequalities of (22)-(24):

$$Yi(x_1)-Yj(x_1) \geq g(x_1) \; Yi(x_2)-Yj(x_2) \leq 0 \qquad (22)$$

For a multi-L2NNN classifier, each logit is a nonexpansive function of the input, and it must be true that:

$$\|x_2 - x_1\|_2 \geq |y_i(x_1) - y_i(x_2)| \qquad (23)$$
$$\|x_2 - x_1\|_2 \geq |y_j(x_2) - y_j(x_1)|$$

Therefore, $$\|x_2 - x_1\|_2 \geq \frac{|y_i(x_1) - y_i(x_2)| + |y_j(x_2) - y_j(x_1)|}{2} \geq \qquad (24)$$

$$\frac{|y_i(x_1) - y_i(x_2) + y_j(x_2) - y_j(x_1)|}{2} =$$

$$\frac{|(y_i(x_1) - y_j(x_1)) + (y_j(x_2) - y_i(x_2))|}{2} \geq \frac{|g(x_1) + 0|}{2} = g(x_1)/2$$

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 20, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 20, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 21:
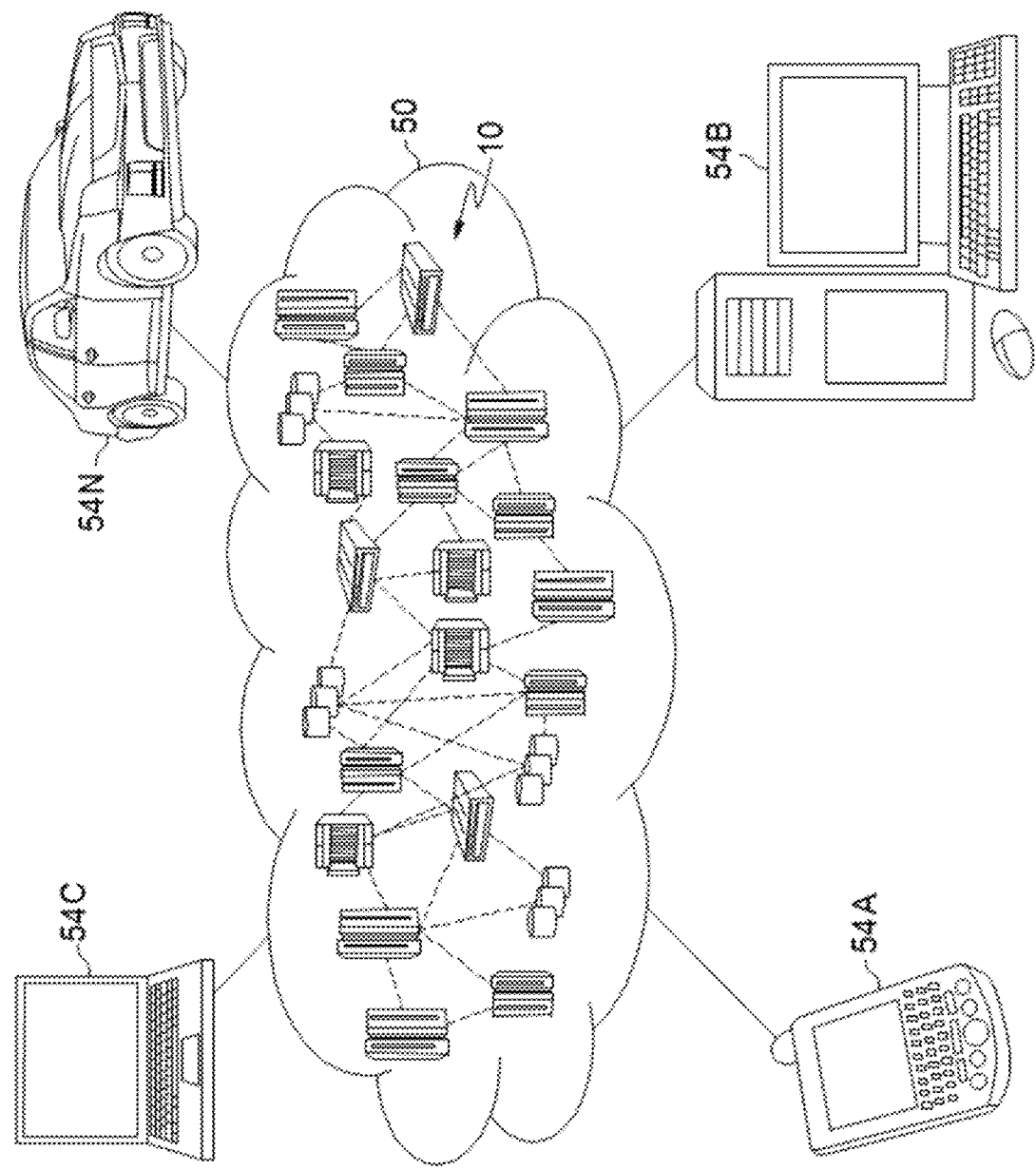
FIG. 21 depicts a cloud-computing environment 50 according to an embodiment of the present invention.

Referring now to FIG. 21, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 21 are intended to be illustrative only and that computing nodes 10 and cloud computing environment 50 can communicate with any type of computerized circuit over any type of network and/or network addressable connection (e.g., using a web browser).

Figure 22:
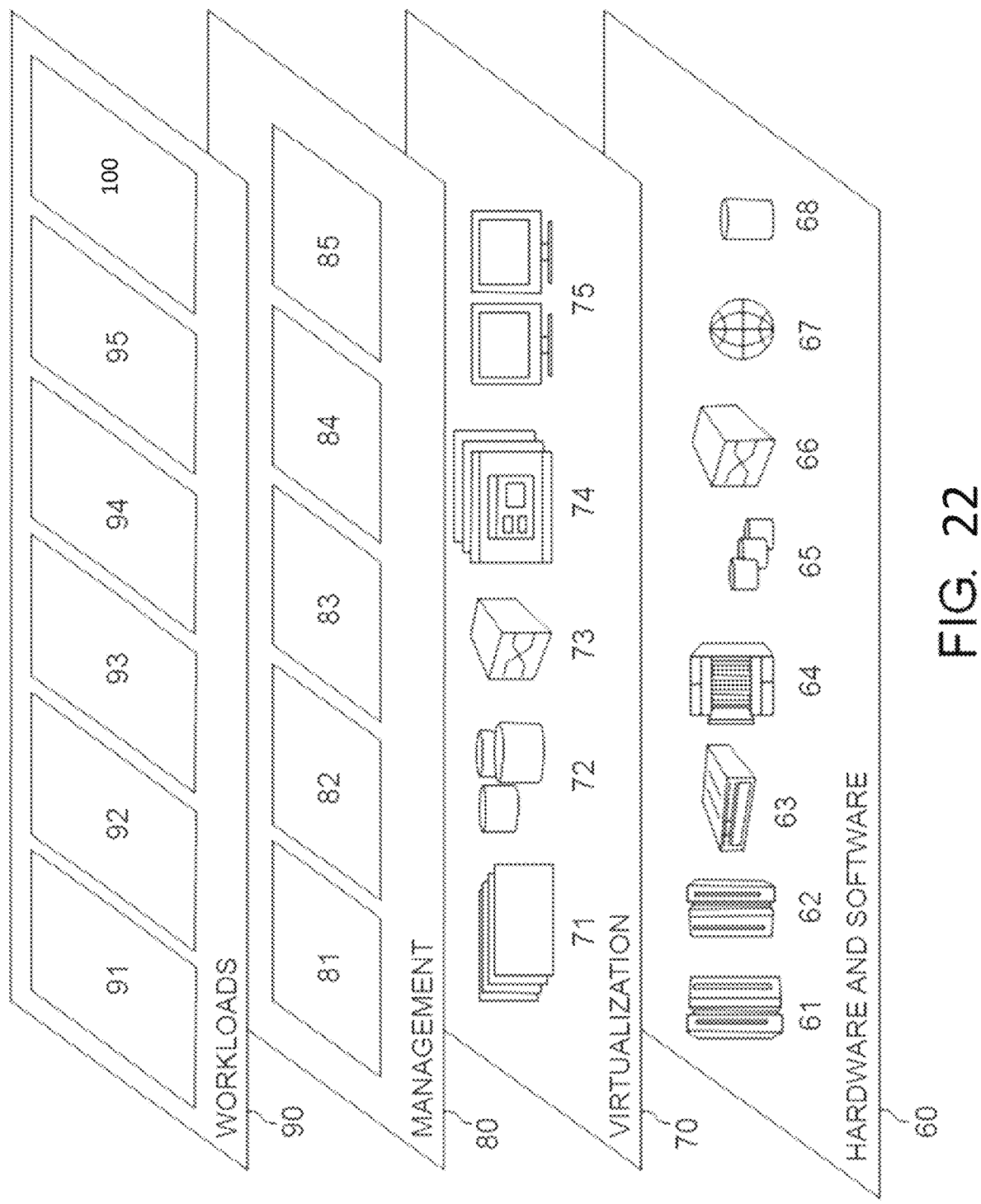
FIG. 22 depicts abstraction model layers according to an embodiment of the present invention.

Referring now to FIG. 22, an exemplary set of functional abstraction layers provided by cloud computing environment 50 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented training method for an L2 non-expansive neural network, the method comprising:
    training the L2 non-expansive neural network including:
        using norm-pooling as a non-linear function; and
        increasing a confidence gap,
    wherein the confidence gap is increased via a loss function.

2. The method of claim 1, further comprising training the neural network including using two-sided ReLU as a non-linear function,
    wherein the non-linear function of the two-sided ReLU comprises a non-expansive and monotonically increasing scalar function.

3. The method of claim 1, wherein the loss function comprises:
    a first term that mimics cross-entropy loss of an ordinary network;
    a second term that is directly related to a classification accuracy; and
    a third term that approximates an average confidence gap.

4. The method of claim 3, wherein the third term includes a log term that is a soft measure of the confidence gap and is asymptotically linear for a gap value having a value greater than a threshold value.

5. The method of claim 1, wherein the confidence gap is increased via a loss function that increases faster than cross-entropy does.

6. The method of claim 1, embodied in a cloud-computing environment.

7. The method of claim 1, wherein the loss function is directly related to a classification accuracy.

8. The method of claim 1, wherein the loss function approximates an average confidence gap.

9. A computer program product for training an L2 non-expansive neural network, the computer program product comprising a computer-readable storage medium having program instructions embodied therewith, the program instructions executable by a computer to cause the computer to perform:
 training the L2 non-expansive neural network including:
  using or norm-pooling as a non-linear function; and
  increasing a confidence gap,
 wherein the confidence gap is increased via a loss function.

10. The computer program product of claim 9, wherein a penalty, as part of a constrained optimization problem, is added when a value of a computed matrix in the training is greater than one, where one is an integer.

11. The computer program product of claim 9, further comprising training the neural network including using two-sided ReLU as a non-linear function,
 wherein the non-linear function of the two-sided ReLU comprises a non-expansive and monotonically increasing scalar function.

12. The computer program product of claim 9, wherein the loss function comprises:
 a first term that mimics cross-entropy loss of an ordinary network;
 a second term that is directly related to a classification accuracy; and
 a third term that approximates an average confidence gap.

13. The computer program product of claim 12, wherein the third term includes a log term that is a soft measure of the confidence gap and is asymptotically linear for a gap value having a value greater than a threshold value.

14. The computer program product of claim 9, wherein the confidence gap is increased via a loss function that increases faster than cross-entropy does.

15. A training system for an L2 non-expansive neural network, the system comprising:
 a processor; and
 a memory, the memory storing instructions to cause the processor to perform:
  training a neural network including:
   increasing a confidence gap; and
   further training such that the network comprises a non-expansive network,
  wherein the confidence gap is increased via a loss function.

16. The system of claim 15, further comprising training the neural network including using two-sided ReLU as a non-linear function,
 wherein the non-linear function of the two-sided ReLU comprises a non-expansive and monotonically increasing scalar function.

17. The system of claim 15, wherein the confidence gap is maximized via the loss function that comprises:
 a first term that mimics cross-entropy loss of an ordinary network;
 a second term that is directly related to a classification accuracy; and
 a third term that approximates an average confidence gap,
 wherein the confidence gap is maximized based on a difference between a largest and a second largest logit of a classifier.

18. The system of claim 17, wherein the third term includes a log term that is a soft measure of the confidence gap and is asymptotically linear for a gap value having a value greater than a threshold value.

19. The system of claim 15, wherein the confidence gap is increased via a loss function that increases faster than cross-entropy does.

20. The system of claim 15, embodied in a cloud-computing environment.

* * * * *